358-86. XR 3,275,742 SR
CROSS REFERENCE SEARCH ROOM

Sept. 27, 1966 K. C. QUINTON ETAL 3,275,742

WIRED BROADCASTING SYSTEMS AND APPARATUS THEREFOR

Filed May 22, 1963

TX500

INVENTORS
Kenneth Charles Quinton, Daniel Henry Smart
By Richard [illegible]
Agt 3,275,742

WIRED BROADCASTING SYSTEMS AND APPARATUS THEREFOR

Kenneth Charles Quinton, Hinchley Wood, Esher, Surrey, and Daniel Henry Smart, Coulsdon, Surrey, England, assignors to Communications Patents Limited Filed May 22, 1963, Ser. No. 282,333
Claims priority, application Great Britain, May 30, 1962, 20,749/62
5 Claims. (Cl. 178—5.2)

Figures 1, 3:
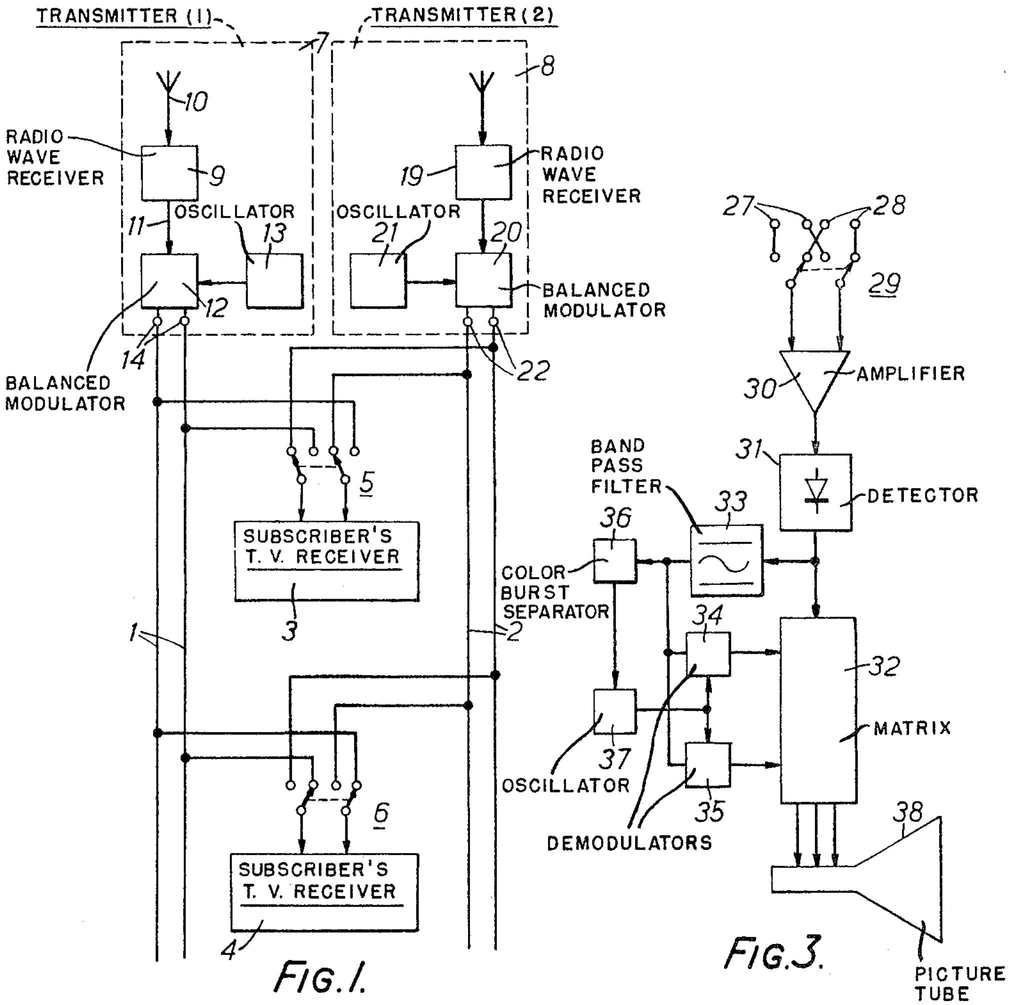

This invention relates to wired broadcasting systems and apparatus for use therein and is particularly concerned with such systems and apparatus which pertain to colour television.

An object of this invention is to enable colour television signals which are being radiated by a radio transmitter of a regular television service to be used for energising the conductive network of a wired broadcasting system in a manner which reduces patterning in the pictures which are produced with the aid of said signals being distributed by this network, in particular to reduce patterning due to the beating of carrier waves adopted for the purposes of effecting this distribution.

According to a first aspect of the invention there is provided a wired broadcasting system pertaining to colour television wherein a transmitting apparatus which serves to energise a conductive network of the system produces and applies to said network a modulated carrier wave brightness information component and a suppressed carrier wave colour information component, the frequencies of said carrier waves differing from each other by an odd multiple of half the line scanning frequency, and means are included which determine that the frequency of the carrier wave of the brightness information component corresponds to a whole multiple of the line scanning frequency, whereby the beating of these carrier waves or their harmonics occurs at frequencies which differ from the fundamental frequencies of said carrier waves by an odd multiple of half the line scanning frequency of the television signals and the visible effect of such beating in a picture produced with the aid of said components is reduced.

According to a second aspect of the invention a colour television transmitting apparatus, for energising a conductive network of a wired broadcasting system, comprises means for producing an electric wave at a frequency which corresponds to a whole multiple of the line scanning frequency of the transmission concerned, means for modulating said electric wave in accordance with brightness information signals to produce a modulated carrier wave brightness information component, means for modulating said electric wave in accordance with suppressed carrier wave signals pertaining to colour information and having a frequency corresponding to an odd multiple of half the line scanning frequency to produce a suppressed carrier wave colour information component, and means for applying said components to the conductive network whereby the beating of these carrier waves or their harmonics occurs at frequencies which differ from the fundamental frequencies of said carrier waves by an odd multiple of half the line scanning frequency of the television signals and the visible effect of such beating in a picture produced with the aid of said components is reduced.

Figure 2:
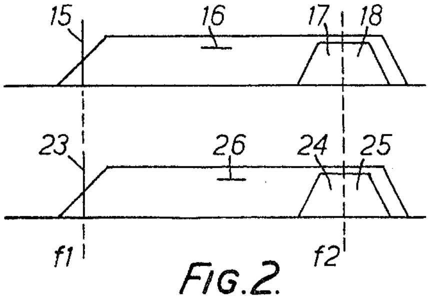

To facilitate a proper understanding of the invention it will now be described, merely by way of example, with reference to the accompanying drawings, wherein:

FIG. 1 is a block diagram of a wired broadcasting system, including its transmitting and receiving apparatus, in accordance with the present invention, FIG. 2 is a diagram showing the frequency relationships of signals involved in the operation of the system shown in FIG. 1 and FIG. 3 is a detail block schematic diagram of a receiving apparatus suitable for use in the system shown in FIG. 1.

The conductive network of the wired broadcasting system shown in FIG. 1 comprises two signal paths, 1 and 2, for example two pairs of conductors of a suitable multipair cable. Each of these paths pertains to the distribution of colour television signals in respect of different transmissions each of which is in respect of different programme material. These paths serve to distribute the television signals from a central station to a plurality of subscribers receivers, two such subscribers receivers being indicated in the drawing at 3 and 4 respectively. Each of these receivers is associated with a programme selecting switch, 5 and 6 respectively, whereby its input circuit can be connected electrically with either of the two signal paths at will in order to accept the signals of the wanted programme.

The central station equipment comprises two sets of transmitting apparatus, 7 and 8, for the purpose of energising the signal paths 1 and 2 respectively. The transmitting apparatus 7, in respect of the first of the two transmissions, comprises a radio wave receiving apparatus 9 which, through the intermediary of an aerial 10, is adapted to receive radio wave colour television signals of a regular television service, it being assumed for the purpose of the following description that this service is being operated according to the 625 line N.T.S.C. system standard. This receiver is arranged and adapted to extract, from the received radio signals, brightness information signals, which include colour burst and synchronising signals, and suppressed carrier wave colour information signals. These extracted signals are applied by way of a line 11 to a balanced modulator 12. There is also applied as an input to this balanced modulator 12 an electric wave from a highly stable carrier wave oscillator 13 which conveniently comprises an oven-controlled crystal drive so as to provide a carrier wave having a frequency which corresponds within a few cycles per second to the desired frequency.

The output from the modulator 12 is fed to terminals 14 for energising the signal path 1 of the network and this output comprises, as shown in FIG. 2, an amplitude modulated carrier wave brightness information component having a carrier wave 15 of frequency $f_1$ which corresponds to a multiple of the line scanning frequency P of the television signals (e.g. $346P$=approximately 5.4 mc./s.), the modulation thereof by the said brightness information signals occupying the frequency band 16. Said output also comprises a double sideband suppressed carrier colour information component, these sidebands being indicated at 17 and 18. The frequency of this suppressed carrier wave is represented by $f_2$ (approximately 9.83 mc./s. in the present example). The difference between the frequencies $f_1$ and $f_2$ is the same as that adopted for the television line standard concerned, that is approximately 4.43 mc./s., which difference results in the present instance in the sidebands 17 and 18 lying within the frequency band 16. However, in some cases the difference between the frequencies $f_1$ and $f_2$ may be such that the sidebands 17 and 18 lie outside the frequency band 16 or partially therein as may be desired or convenient. In any case the frequencies $f_1$ and $f_2$ are arranged to differ by an odd multiple of half the line scanning frequency of the television line standard concerned.

By thus arranging that the frequency $f_1$ corresponds to a whole multiple of the line scanning frequency the beating between the carrier waves or their harmonics occurs at frequencies differing by half the line scanning frequency with the result that beat patterns present on the received picture are phase reversed on alternate picture scans and therefore appear as a dot-pattern instead of a bar-pattern, such dot-pattern being less visible to the viewer.

The transmitting apparatus 8, pertaining to the second transmission, is similar to the transmitting apparatus 7 and the frequencies of the carrier waves of the two components being applied to the signal path 2 are approximately the same (say within a few cycles per second) as the frequencies of the carrier waves of the corresponding components pertaining to the transmission in the signal line 1, namely $f_1$ in respect of the brightness information component and $f_2$ in respect of the suppressed carrier colour information component. For this purpose the apparatus 8 comprises a radio receiver 19 a balanced modulator 20 and a highly stable oscillator 21, which are the equivalents of the corresponding devices 9, 12 and 13 of the apparatus 7, and provides at terminals 22, for application to the signal path 2, signals which, as shown in FIG. 2, comprise an amplitude modulated carrier wave brightness information component having a carrier wave 23, at frequency $f_1$, and a double sideband suppressed carrier colour information component the sidebands of which are indicated at 24, 25. The modulation of the carrier wave 23 by the brightness information signals of this second transmission occupy the frequency band 26.

The television receiver shown in FIG. 3 comprises two pairs of input terminals, 27 and 28, which are adapted to be connected to the conductors of the signal paths 1 and 2 respectively. A programme selection switch 29 (5 or 6 in FIG. 1) enables the input circuit of an amplifier 30 to be connected at will to either of the paths 1 or 2 according to which of the two transmissions it is desired to receive. The amplified signals obtained from this amplifier 30 are applied to a detector 31 which provides an output comprising the brightness and colour information signals of the transmission and this output is applied to a matrix 32 and also to a band pass filter 33, the latter passing only the colour information signals which are fed to two demodulators, 34 and 35, and to a colour burst separator 36. The latter serves to separate from the signals applied thereto synchronising signals by which the frequency and phase of a re-insertion carrier, produced by an electric wave oscillator, 37 are controlled. The re-insertion carrier obtained from this oscillator 37 is fed to the demodulators 34 and 35 to effect demodulation of the two quadrature components, which components are applied to the matrix 32 to produce, from the three signals applied to it, signals appropriate for controlling a cathode ray picture tube 38.

A monochrome receiver may be connected to the system shown in FIG. 1 to receive the colour transmissions in black and white, in which case the employment of the present invention is equally effective in reducing visible patterning on the picture produced by such a receiver.

A particular advantage of the invention is the fact that the linearity requirements of repeater amplifiers in the signal paths between the transmitting and receiving apparatus may be less stringent in some respects than when the brightness and colour carrier frequencies are not arranged in accordance with the present invention.

It is usual practice in wired television systems to transmit the sound accompaniment of the picture as audio frequency signals over a conductive path of the network, that is to say without the use of a carrier wave, and it is deemed unnecessary to present details of this known technique in this specification.

What we claim is:

1. In a wired broadcasting system pertaining to color television, which includes a transmitting apparatus serving to energize a conductive network of the system by producing and applying to said network a modulated carrier wave brightness information component and a suppressed carrier wave color information component, the frequencies of said carrier waves differing from each other by an odd multiple of half the line scanning frequency, said system further including frequency control means for establishing the frequency of the carrier wave of the brightness information component at a whole multiple of the line scanning frequency, the beating of these carrier waves and their harmonics thereby occurring at frequencies which differ from the fundamental frequencies of said carrier waves by an odd multiple of half the line scanning frequency of the television signals to reduce the visible effect of such beating in a picture produced with the aid of said components.

2. The wired broadcasting system according to claim 1, further including a plurality of conductive networks and a corresponding plurality of sets of transmitting apparatus, each set of transmitting apparatus being arranged to energize a corresponding one of each of said plurality of conductive networks.

3. In a color television transmitting apparatus for energizing a conductive network of a wired broadcasting system, which apparatus comprises modulator means for modulating an electric wave in accordance with a brightness information signal and also in accordance with a suppressed carrier wave signal, the latter pertaining to color information and having a frequency corresponding to an odd multiple of half the line scanning frequency, to produce respectively a modulated carrier wave brightness information component and a suppressed carrier wave color information component, and coupling means for applying said components to said conductive network, said system further including frequency control means for producing said electric wave at a frequency which corresponds to a whole multiple of the line scanning frequency of the transmission concerned, the beating of these carrier waves and their harmonics thereby occurring at frequencies which differ from the fundamental frequencies of said carrier waves by an odd multiple of half the line scanning frequency of the television signals to reduce the visible effect of such beating in a picture produced with the aid of said components.

4. The color television transmitting apparatus according to claim 3, further including a radio wave receiving device to derive from a received color television transmission brightness information signals and suppressed carrier wave signals pertaining to color information, and means for applying said brightness information signals and said carrier wave signals to said modulator means.

5. The color television transmitting apparatus according to claim 4, still further including an electric wave oscillator having an oven-controlled crystal drive to provide said electric wave at a frequency corresponding to a whole multiple of the line scanning frequency of the television transmission concerned.

References Cited by the Examiner

UNITED STATES PATENTS 2,876,279 3/1959 Fuller .............. 178—5.6

OTHER REFERENCES

Fink: Television Engineering Handbook, McGraw-Hill, New York, 1957, pp. 2–14 to 2–17 and 18–66 to 18–69.

DAVID G. REDINBAUGH, *Primary Examiner.*

J. A. O'BRIEN, *Assistant Examiner.*